(12) United States Patent
Kawai

(10) Patent No.: US 7,760,416 B2
(45) Date of Patent: Jul. 20, 2010

(54) ELECTROPHORESIS DISPLAY DEVICE AND ELECTRONIC APPARATUS

(75) Inventor: Hideyuki Kawai, Fujimi-machi (JP); Andrea Kurrer, legal representative, Fujimi (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 12/082,834

(22) Filed: Apr. 15, 2008

(65) Prior Publication Data

US 2008/0259432 A1 Oct. 23, 2008

(30) Foreign Application Priority Data

Apr. 17, 2007 (JP) ............... 2007-108083

(51) Int. Cl.
*G02B 26/00* (2006.01)
*G09G 3/34* (2006.01)
(52) U.S. Cl. ...................... 359/296; 345/107
(58) Field of Classification Search .......... 359/296; 345/107, 105; 430/32, 34, 38; 204/450, 204/600
See application file for complete search history.

(56) References Cited

U.S. PATENT DOCUMENTS 6,376,828 B1 * 4/2002 Comiskey .................. 250/216
7,019,889 B2 * 3/2006 Katase ....................... 359/296

FOREIGN PATENT DOCUMENTS

| JP | 5-136391 A | 6/1993 |
|---|---|---|
| JP | 5-281516 A | 10/1993 |
| JP | 11-75115 A | 3/1999 |
| JP | 2005-85265 A | 3/2005 |
| JP | 2005-148711 A | 6/2005 |
| JP | 2005-340265 A | 12/2005 |

* cited by examiner

*Primary Examiner*—Ricky L Mack
*Assistant Examiner*—Tuyen Q Tra
(74) *Attorney, Agent, or Firm*—AdvantEdge Law Group, LLC

(57) ABSTRACT

The invention provides an electrophoresis display device that includes: a pair of a first substrate and a second substrate that are provided opposite to each other; an electrophoresis material layer that is sandwiched between the first substrate and the second substrate; a plurality of pixel areas that is formed on the first substrate and the second substrate; a plurality of optical detection elements which is formed either in the pixel areas or adjacent to the pixel areas; and a plurality of optical transmission paths each of which is formed between the first substrate and the second substrate and propagates incident light that enters through an outer surface of the second substrate so that the light reaches the corresponding optical detection element.

8 Claims, 7 Drawing Sheets

ELECTROPHORESIS DISPLAY DEVICE AND ELECTRONIC APPARATUS

BACKGROUND

1. Technical Field

The present invention relates to an electrophoresis display device and an electronic apparatus.

2. Related Art

An electrophoresis display device is known in the technical field to which the present invention pertains. An electrophoresis display device that is known in the art displays an image by utilizing an electrophoresis phenomenon. Electrophoresis is a phenomenon that can be roughly defined as the migration of electrically charged particles that are dispersed in liquid, which occurs as a result of application of a voltage thereto. An example of an electrophoresis display device of the related art is described in JP-A-2005-148711. In a popular configuration of an electrophoresis display device of the related art, an electrophoresis material layer is sandwiched between a pair of substrates that are provided opposite to each other. In the electrophoresis material layer that is interposed between these substrates that face each other, electrically charged minute particles are dispersed in a solvent. Recently, an active-matrix electrophoresis display device has become one of the leading mainstreams among a variety of the related-art electrophoresis display devices.

In a typical configuration of an active-matrix electrophoresis display device of the related art, a common electrode is formed on the inner surface of one of the above-mentioned pair of substrates, or more specifically, one substrate that is provided at a display side thereof. On the other hand, pixel electrodes, switching elements, wirings, and the like, are formed on another substrate that is provided at a non-display side opposite to the display side of the above-mentioned one substrate. Generally speaking, the "numerical aperture", that is, opening ratio, of a substrate is relatively low if switching elements, wirings, and the like, are formed thereon. In order to prevent the opening ratio of the display-side substrate, which is closer to a viewer and thus should have a high opening ratio, from being decreased, these switching elements, wirings, and the like, are not formed on the viewer-side substrate but formed on the other substrate that is provided opposite to the viewer-side substrate.

The related-art electrophoresis display device having such a typical configuration operates as follows. For example, if it is assumed that electrically charged particles thereof are charged negative (i.e., electronegative), the electrically charged particles move in a direction that is reverse to an electrostatic direction, or in other words, in a direction that is reverse to an electric-field direction, upon the generation of an electric field between a pixel electrode and a common electrode. When the electrically charged particles move to the surface of the common electrode, the coloration of the electrically charged particles is visually recognized at the display side. On the other hand, when the electrically charged particles move to the surface of the pixel electrode, the coloration of the solvent is visually recognized at the display side.

In a typical configuration of an electrophoresis display device known in the art, the above-explained electrophoresis configuration is formed for each of a plurality of pixels. The migration, that is, movement, of the electrically charged particles of electronic ink is controlled on a pixel-by-pixel basis. By this means, the related-art electrophoresis display device is capable of displaying a variety of images such as a still picture and a moving picture. In another recent configuration of an electrophoresis display device known in the art, electronic ink is filled inside a microcapsule.

As an advantageous aspect of the electrophoresis display device of the related art, it is capable of retaining a display state for a certain length of a time period. Having such a unique characteristic, it is expected that the electrophoresis display device of the related art can be used as a variety of devices that employs electronic paper. One non-limiting application example of the electrophoresis display device of the related art in the technical field of electronic paper is an electronic personal organizer. In the application of an electrophoresis display device to an electronic personal organizer, in order to improve user-friendliness thereof, it is preferable that the device should be provided not only with an image display function but also with a handwritten input function. As one related-art technique for offering a handwritten input capability, an active-matrix electrophoresis display device of the related art is provided with optical sensors such as photodiodes or the like that are formed on an array substrate on which pixels electrodes, switching elements, and the like are formed. An example of the active-matrix electrophoresis display device of the related art having such an optical sensing configuration is described in JP-A-11-75115.

Disadvantageously, however, since an electrophoresis display device is configured in such a manner that electrically charged particles or a dispersion medium is observed, incident light that enters through the display-side substrate is shut off by the electrically charged particles and/or the dispersion medium; as a result thereof, little light reaches the array substrate. If optical sensors are arrayed on an array substrate that is provided at a non-display side without any technical structure that facilitates optical transmission thereof, it is hard for incident light that enters through the display-side substrate to reach the optical sensors formed on the non-display-side substrate. This makes it difficult to increase the application range of an electrophoresis display device.

SUMMARY

An advantage of some aspects of the invention is to provide an electrophoresis display device that can be used in a variety of ways. In addition, as an advantage of some aspects thereof, the invention provides an electronic apparatus that is provided with an electrophoresis display device having broader applications and uses.

In order to address the above-identified problem without any limitation thereto, the invention provides, as a first aspect thereof, an electrophoresis display device that includes: a pair of a first substrate and a second substrate that are provided opposite to each other; an electrophoresis material layer that is sandwiched between the first substrate and the second substrate; a plurality of pixel areas that is formed on the first substrate and the second substrate; a plurality of optical detection elements which is formed either in the pixel areas or adjacent to the pixel areas; and a plurality of optical transmission paths each of which is formed between the first substrate and the second substrate and propagates incident light that enters through an outer surface of the second substrate so that the light reaches the corresponding optical detection element.

An electrophoresis display device according to the first aspect of the invention described above ensures that incident light that enters through the outer surface of the second substrate propagates through the optical transmission path to reach the optical detection element without being shut off by the electrophoresis material layer because it has the above-described unique configuration that includes: a pair of a first substrate and a second substrate that are provided opposite to each other; an electrophoresis material layer that is sandwiched between the first substrate and the second substrate; a plurality of pixel areas that is formed on the first substrate and the second substrate; a plurality of optical detection elements which is formed either in the pixel areas or adjacent to the pixel areas; and a plurality of optical transmission paths each of which is formed between the first substrate and the second substrate and propagates incident light that enters through an outer surface of the second substrate so that the light reaches the corresponding optical detection element. Thus, as an advantage of the first aspect thereof, the invention provides an electrophoresis display device that has an excellent optical sensing capability in addition to an image display capability, which offers a broad range of applications and uses for the benefit of users. The optical transmission path can be embodied in a variety of configurations as long as it can transmit (i.e., propagate), to the optical detection element, light having an optical intensity that is large enough for the optical detection element to make detection. For example, the optical transmission path can be embodied as a member that can transmit light. Or, the optical transmission path can be embodied as an air passage.

In the configuration of the electrophoresis display device according to the first aspect of the invention described above, it is preferable that the optical detection element and the optical transmission path should be provided not in each of the plurality of pixel areas but for every certain number of pixel areas. Generally speaking, it is known in the art that the minimum resolution that is required for the recognition of a handwritten input is lower than the minimum resolution that is required for the display of images. In the preferred configuration of the electrophoresis display device described above, the optical detection element and the optical transmission path are provided not in each of the plurality of pixel areas but for every certain number of pixel areas. With such a preferred configuration, in comparison with a case where the optical detection element and the optical transmission path are provided in every pixel area, it is possible to obtain a higher opening ratio while maintaining detection accuracy in handwritten input recognition at a sufficient level.

Herein, the "(every) certain number (of pixel areas)" should be set with due considerations to the minimum resolution that is required for the recognition of a handwritten input so as to maintain detection accuracy in handwritten input recognition at a sufficient level. For example, if it is assumed that the array pitch of the pixel electrodes is 100 µm and that the minimum resolution that is required for the recognition of a handwritten input is 200 µm, one optical detection element should be provided for every second pixel area.

In the configuration of the electrophoresis display device according to the first aspect of the invention described above, it is preferable that the optical transmission path should be formed at a position overlapping the optical detection element in a plan view. With such a preferred configuration, it is possible to facilitate light that propagates through the optical transmission path to reach the optical detection element because the optical transmission path is formed at a position overlapping the optical detection element in a plan view. With such a preferred configuration, it is possible identify an incident position at which incoming light enters in an easier manner because the position at which incident light enters the optical transmission path is substantially in alignment with the position of the optical detection element.

In the configuration of the electrophoresis display device according to the first aspect of the invention described above, it is preferable that the optical transmission path should be made of a material that can transmit incident light that enters through the outer surface of the second substrate. With such a preferred configuration, it is possible to reduce variations in the shape of the optical transmission paths in comparison with a case where the optical transmission path is configured as a cavity because, in this preferred configuration, the optical transmission path is made of a material that can transmit incident light that enters through the outer surface of the second substrate.

In the configuration of the electrophoresis display device according to the first aspect of the invention described above, it is preferable that the optical transmission path should have a cross-sectional dimension that increases from the electrophoresis-material-layer-side surface of the second substrate toward the opposite electrophoresis-material-layer-side surface of the first substrate. With such a preferred configuration, since the optical transmission path has a cross-sectional dimension that increases from the electrophoresis-material-layer-side surface of the second substrate toward the opposite electrophoresis-material-layer-side surface of the first substrate, the opening ratio of the second substrate, which is a display-side substrate, is higher than that of the first substrate over which the pixel electrodes are formed. Therefore, the electrophoresis display device having a preferred configuration described above makes it possible to display an image with enhanced contrast.

In the configuration of the electrophoresis display device according to the first aspect of the invention described above, it is preferable that the electrophoresis material layer should be made of liquid composition containing an electrophoresis material that is dispersed in a dispersion medium; a pixel electrode should be provided in each of the pixel areas; partition walls each of which demarcates the pixel area and at least partially overlaps the corresponding optical detection element in a plan view should be formed; and the partition walls should double as the optical transmission paths. Having such a preferred configuration, the electrophoresis display device described above offers a higher opening ratio in comparison with a case where separate or additional optical transmission paths other than the partition walls are provided because the electrophoresis material layer is made of liquid composition containing an electrophoresis material that is dispersed in a dispersion medium; a pixel electrode is provided in each of the pixel areas; partition walls each of which demarcates the pixel area and at least partially overlaps the corresponding optical detection element in a plan view are formed; and the partition walls double as the optical transmission paths.

In order to address the above-identified problem without any limitation thereto, the invention provides, as a second aspect thereof, an electronic apparatus that is provided with the electrophoresis display device according to the first aspect of the invention described above. As explained above, an electronic apparatus according to the second aspect of the invention is provided with an electrophoresis display device according to the first aspect of the invention, which has an excellent optical sensing capability in addition to an image display capability and thus offers a broad range of applications and uses for the benefit of users. Therefore, the electronic apparatus according to the second aspect of the invention also offers a broad range of applications and uses for the benefit of users.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
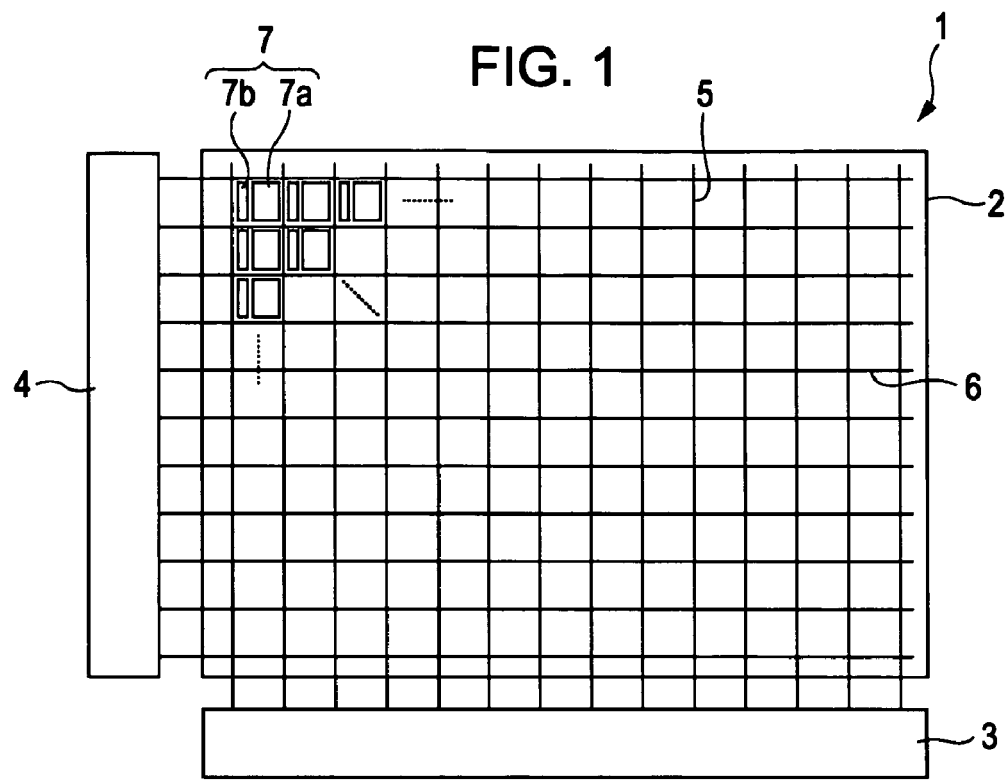
FIG. 1 is a plan view that schematically illustrates an example of the configuration of an electrophoresis display device according to a first embodiment of the invention.

With reference to the accompanying drawings, a first exemplary embodiment of the invention is explained below. FIG. 1 is a diagram that schematically illustrates an example of the configuration of an electrophoresis display device 1 according to the present embodiment of the invention. As illustrated in FIG. 1, the electrophoresis display device 1 according to the present embodiment of the invention is provided with an image display unit (e.g., image display area) 2, a data-line driving circuit 3, a scanning-line driving circuit 4, a plurality of data lines 5, and a plurality of scanning lines 6. The electrophoresis display device 1 according to the present embodiment of the invention is capable of displaying a variety of images such as a still picture and a moving picture. In addition to such an image display function, the electrophoresis display device 1 has an optical sensing function. That is, the electrophoresis display device 1 is capable of recognizing, that is, sensing, handwritten input that is entered by a user by means of an optical pen device or the like. An external control circuit or the like is attached to the electrophoresis display device 1.

The image display unit 2 of the electrophoresis display device 1 is a functional section or area that displays an image. The image display unit 2 has the shape of a rectangle in a plan view, though not necessarily limited thereto. In the illustrated example thereof, it has a relatively short side extending in the vertical direction, whereas it has a relatively long side extending in the horizontal direction. A plurality of pixel areas (i.e., pixel regions) 7 is formed in a matrix pattern in the image display unit 2 of the electrophoresis display device 1. Each of the pixel areas 7 has a dot area (i.e., dot region) 7a and an optical sensing area (i.e., optical sensing region) 7b. The dot area 7a of the pixel area 7 is provided for performing image display. The optical sensing area 7b of the pixel area 7 is provided for detecting some light having a certain optical intensity among all incident light that enters the image display unit 2.

The data-line driving circuit 3 is a circuit that supplies a data-line driving signal to each of the plurality of data lines 5. The data-line driving circuit 5 is provided at a region outside the image display unit 2. The data-line driving circuit 3 extends along the horizontal longer side of the image display unit 2. On the other hand, the scanning-line driving circuit 4 is a circuit that supplies a scanning-line driving signal to each of the plurality of scanning lines 6. The scanning-line driving circuit 4 is provided at a region outside the image display unit 2. The scanning-line driving circuit 4 extends along the vertical shorter side of the image display unit 2.

The data lines 5 are wirings each of which supplies a data-line driving signal that is issued from the data-line driving circuit 3 to the dot area 7a of the pixel area 7a. Each of the data lines 5 extends along the vertical shorter side of the image display unit 2 between the corresponding pair of columns of the pixel areas 7 that are arrayed, as has already been explained above, in a matrix pattern in the image display area 2.

The scanning lines 6 are wirings each of which supplies a scanning-line driving signal that is issued from the scanning-line driving circuit 4 to the dot area 7a of the pixel area 7a. Each of the scanning lines 6 extends along the horizontal longer side of the image display unit 2 between the corresponding pair of rows of the pixel areas 7 that are arrayed in the above-described matrix pattern in the image display area 2.

Figure 2:
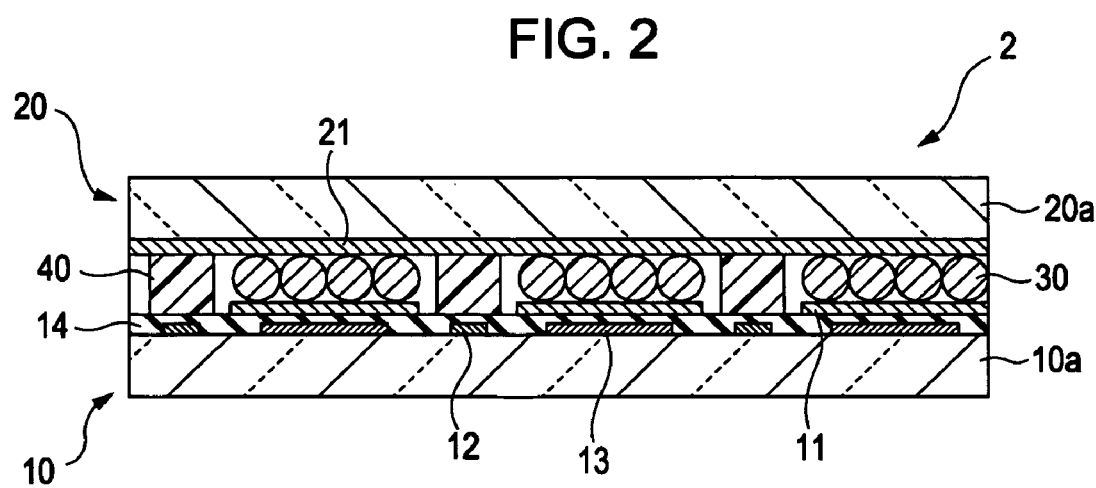
FIG. 2 is a sectional view that schematically illustrates an example of the configuration of an image display unit of the electrophoresis display device according to the first embodiment of the invention.

FIG. 2 is a sectional view that schematically illustrates an example of the configuration of the image display unit 2 of the electrophoresis display device 1 according to the present embodiment of the invention. As illustrated in the drawing, the image display unit 2 is mainly made up of, though not necessarily limited thereto, an element substrate 10, a display substrate 20, a plurality of microcapsules 30, and a plurality of optical transmission members 40. The element substrate 10 described in the present embodiment of the invention corresponds to "a first substrate" according to an aspect of the invention, whereas the display substrate 20 described in the present embodiment of the invention corresponds to "a second substrate" according to an aspect of the invention. The microcapsules 30 described in the present embodiment of the invention collectively correspond to an "electro-optical material" according to an aspect of the invention. Finally, each of the optical transmission members (i.e., light-propagation members) 40 described in the present embodiment of the invention corresponds to an "optical transmission path" (i.e., light-propagation path) according to an aspect of the invention. The element substrate 10 and the display substrate 20 are provided opposite to each other. The microcapsules 30 and the optical transmission members 40 are provided in the same single layer, which corresponds to an "electrophoresis material layer" according to an aspect of the invention. The image display unit 2 is configured as the pair of the element substrate 10 and the display substrate 20 with the above-described electrophoresis material layer being sandwiched therebetween, where the electrophoresis material layer contains the microcapsules 30 and the optical transmission members 40.

The element substrate 10 is mainly made up of, though not necessarily limited thereto, a base substance 10a, a plurality of pixel driving circuits 13, a plurality of optical detection elements 12, an insulation layer 14, and a plurality of pixel electrodes 11. The base substance 10a of the element substrate 10 is configured as a rectangular substrate that is made of, for example, a glass material or plastic material.

The pixel driving circuits 13 are provided on the inner surface of the base substance 10a of the element substrate 10. In other words, the pixel driving circuits 13 are provided on a surface of the base substrate 10a of the element substrate 10 that faces the opposite surface of the display substrate 20. Each of the pixel driving circuits 13 is configured as a circuit that supplies a driving signal to the corresponding one of the plurality of pixel electrodes 11. A switching element is provided in each of the pixel driving circuits 13. The pixel driving circuit 13 is electrically connected to the data line 5 via the switching element thereof.

The optical detection element 12 is formed on the inner surface of the base substance 10a of the element substrate 10. The optical detection element 12 is formed in the same single layer as that of the pixel driving circuit 13. The optical detection element 12 is a photoelectric conversion element that converts an optical signal, that is, a light signal, into an electric signal. An electric signal that is generated as a result of photoelectric conversion performed by the optical detection element 12 (i.e., photoelectric conversion element) is transmitted to the pixel driving circuit 13, which is a non-limiting example of the electric configuration of the electrophoresis display device 1 according to the present embodiment of the invention. The optical detection element 12 can be configured as, for example, a pixel circuit that is provided with a photodiode an example of which is described in JP-A-2005-340265 or JP-A-5-281516. Or, the optical detection element 12 may be configured as a phototransistor an example of which is described in JP-A-2005-085265. As another example, the optical detection element 12 may be configured by means of a photosensitive material an example of which is described in JP-A-5-136391. Needless to say, the configuration of the optical detection element 12 is not limited to any of specific examples described above. One optical detection element 12 is provided in each of the plurality of pixel areas 7.

In a plan view, an area at which the optical detection element 12 is provided constitutes the optical sensing area 7b of the pixel area 7 described above. As the percentage of area occupied by the optical detection element 12 increases among the entire region of the pixel area 7, the percentage of area occupied by the pixel electrode 11 decreases, which means that the opening ratio thereof decreases. Therefore, it is preferable that a photoelectric conversion element that occupies an area as small as possible should be adopted as the optical detection element 12.

The insulation layer 14 is made of an inorganic substance such as $SiO_2$ or SiN, though not limited thereto. The insulation layer 14 is deposited in such a manner that it covers the entire surface of the base substance 10a of the element substrate 10, including the pixel driving circuits 13 and the optical detection elements 12. A contact hole is formed in a region of the insulation layer 14 that overlaps each of the plurality of pixel driving circuits 13 in a plan view. It should be noted that these contact holes are not illustrated in the drawing. Each of the pixel driving circuits 13 and the corresponding pixel electrode 11 are electrically connected to each other via the corresponding contact hole.

The pixel electrode 11 is configured as an electrode that is made of an electro-conductive material (i.e., conductive material) such as a metal or indium tin oxide (hereafter abbreviated as "ITO"), though not limited thereto. The pixel electrodes 11 are provided on the surface of the insulation layer 14. As the pixel electrode 11 is electrically connected to the pixel driving circuit 13, a signal is supplied from the pixel driving circuit 13 to the pixel electrode 11. One pixel electrode 11 is provided in each of the plurality of pixel areas 7. In a plan view, an area at which the pixel electrode 11 is provided constitutes the dot area 7a of the pixel area 7 described above.

The display substrate 20 is mainly made up of a cover member 20a and a common electrode 21. The cover member 20a of the display substrate 20 is configured as a rectangular substrate that is made of an optically transparent material such as, for example, a transparent plastic material. The common electrode 21 formed on the entire inner surface of the cover member 20a. That is, the common electrode 21 is provided on a surface of the cover member 20a of the display substrate 20 that faces the opposite surface of the element substrate 10. The common electrode 21 is configured as an electrode that is made of an electro-conductive material that can transmit light. For example, the common electrode 21 may be made of ITO or the like. The common electrode 21 is electrically configured in such a manner that a voltage can be applied between the pixel electrode 11 and the common electrode 21.

The microcapsule 30 is configured as a minute capsule that has a diameter of, for example, approximately 50 μm. The microcapsule 30 is made of, for example, an acrylic resin including but not limited to polymethyl methacrylate or polyethyl methacrylate, a urea resin, or a polymeric resin having optical transparency such as gum arabic or the like. The plurality of microcapsules 30 is arrayed vertically and horizontally in each of the dot areas 7a of the pixel areas 7.

Each of the optical transmission members 40 is configured as an optically transparent member that is made of a material that can transmit light. The optical transmission member 40 has the shape of a pillar. The material of the optical transmission member 40 is not limited to one that transmits visible light only. That is, the optical transmission member 40 may be made of a material that passes not only visible light but also other light having a spectral range different from that of the visible light. For example, the optical transmission member 40 may be made of a material that transmits infrared rays. It should be noted that it is not necessary for the optical transmission performance of the optical transmission member 40 to be close to a hundred percent. It is sufficient as long as the optical transmission member 40 has an optical transparency that is clear enough for the optical detection element 12 to detect light. As a non-limiting example of the material thereof, the optical transmission member 40 may be made of a resin material such as an acrylic resin, PET, or PES. Or, the optical transmission member 40 may be made of an inorganic material such as $SiO_2$, though not limited thereto. The optical transmission member 40 is provided at an area that overlaps the optical detection element 12 in a plan view. With such an exemplary configuration, it is possible identify an incident position at which incoming light enters in an easier manner because the position at which incident light enters at the display-substrate (20) side is substantially in alignment with the position of the optical detection element 12.

In a plan view, the optical transmission member 40 is formed at an area that is broader than an area at which the optical detection element 12 is formed. With such a configuration, incident light that enters the display substrate 20 can propagate through a relatively broad area where the optical transmission member 40 is formed. In such a configuration, it is preferable that the index of refraction inside an area at which the optical transmission member 40 is formed should be higher than that of a surrounding area that is adjacent to the area at which the optical transmission member 40 is formed in order to prevent incident light that enters the optical transmission member 40 and propagates therein from leaking outside the area at which the optical transmission member 40 is formed. If so configured, because of a difference between the refractive index of the light-propagating area (i.e., portion) at which the optical transmission member 40 is formed and the refractive index of the neighboring area (i.e., portion) thereof, light that propagates inside the optical transmission member 40 is reflected at the boundary between the light-propagating area at which the optical transmission member 40 is formed and the neighboring area thereof. Therefore, it is possible to ensure that the light that propagates inside the optical transmission member 40 reaches the optical detection element 12 in an easier manner.

Figure 3:
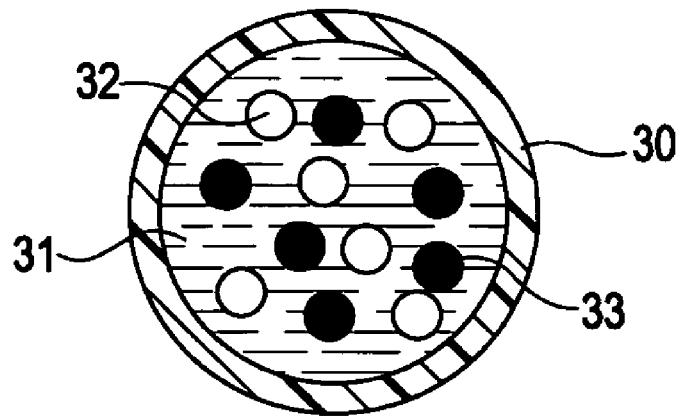
FIG. 3 is a diagram that schematically illustrates an example of the configuration of a microcapsule.

FIG. 3 is a diagram that schematically illustrates an example of the configuration of the microcapsule 30. A plurality of electrically charged particles that are made up of a plurality of white particles 32 and a plurality of black particles 33 as well as a dispersion medium (i.e., dispersion solvent) 31 are sealed inside the microcapsule 30. The plurality of white particles 32 and the plurality of black particles 33 function as electrophoresis dispersoid particles.

The dispersion medium (i.e., dispersion solvent) 31 is a liquid that enables the white particles 32 and the black particles 33 to be dispersed inside the microcapsule 30. The dispersion medium 31 can be formed as a compound of a surfactant (i.e., surface-active agent) and either a single chemical element/material/substance or combined chemical elements/materials/substances that is/are selected from, without any intention to limit thereto: water, alcohol solvent such as methanol, ethanol, isopropanol, butanol, octanol, methyl cellosolve or the like, ester kinds such as ethyl acetate, butyl acetate or the like, ketone kinds such as acetone, methyl ethyl ketone, methyl isobutyl ketone or the like, aliphatic hydrocarbon such as pentane, hexane, octane or the like, alicyclic hydrocarbon such as cyclohexane, methylcyclohexane or the like, aromatic hydrocarbon such as benzene kinds having a long-chain alkyl group such as benzene, toluene, xylene, hexyl benzene, butyl benzene, octyl benzene, nonyl benzene, decyl benzene, undecyl benzene, dodecyl benzene, tridecyl benzene, tetradecyl benzene or the like, halogenated hydrocarbon such as methylene chloride, chloroform, carbon tetrachloride, 1,2-dichloroethane or the like, carboxylate, or any other kind of oil and fat.

Each of the white particles 32 and the black particles 33, which are electrophoresis dispersoid particles, has a property to move in the dispersion medium 31 when an electric potential difference occurs therein. The white particle 32 is constituted as, for example, a particle (i.e., high polymer or colloid) made of white pigment such as titanium dioxide, hydrozincite, antimony trioxide or the like. In the present embodiment of the invention, the white particle 32 is charged negatively though not limited thereto. On the other hand, the black particle 33 is constituted as, for example, a particle (i.e., high polymer or colloid) made of black pigment such as aniline black, carbon black or the like. In the present embodiment of the invention, the black particle 33 is charged positively though not limited thereto.

If necessary, a charge-controlling agent, a dispersing agent, a lubricant, a stabilizing agent, or the like, may be added to these pigments. The charge-controlling agent may be made of particles of, for example, electrolyte, surface-active agent, metallic soap, resin, gum, oil, varnish, or compound, though not limited thereto. The dispersing agent may be a titanium-system coupling agent, an aluminum-system coupling agent, a silane-system coupling agent, though not limited thereto.

Figure 4:
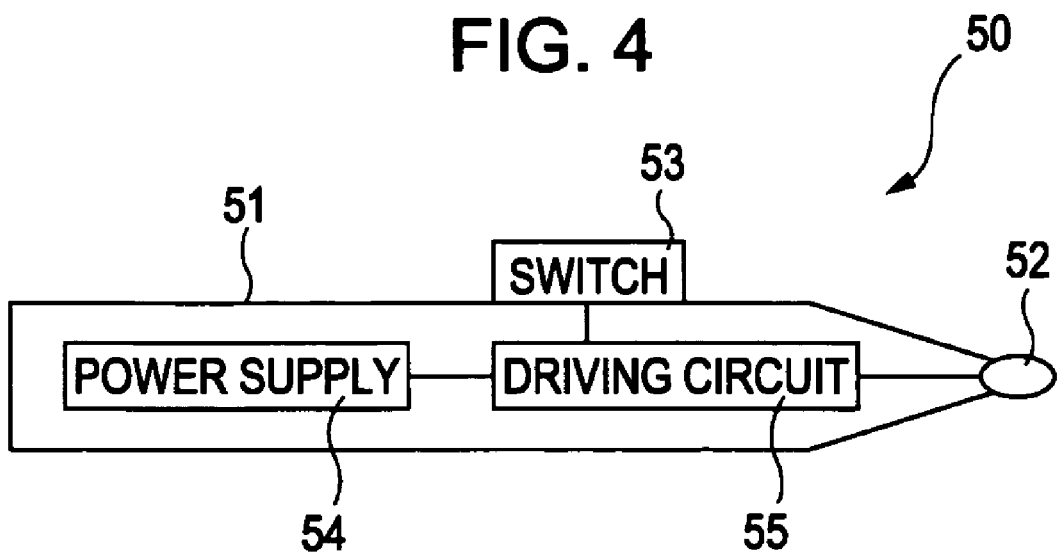
FIG. 4 is a diagram that schematically illustrates an example of the configuration of an optical pen device.

FIG. 4 is a diagram that schematically illustrates an example of the configuration of the optical pen device 50. As illustrated in FIG. 4, the optical pen device 50 is mainly made up of, though not necessarily limited thereto, a case 51, a light-emitting pen-point unit 52, a switch 53, a power supply 54, and a driving circuit 55.

The case 51 is made of a plastic material, though not limited thereto. The power supply 54 and the driving circuit 55 is housed inside the case 51. The power supply 54 supplies power so as to activate the light-emitting pen-point unit 52 to emit light. When the power supply 54 is turned ON, the driving circuit 55 supplies a light-emission driving signal to the light-emitting pen-point unit 52.

The light-emitting pen-point unit 52 is provided at the tip of the case 51. The light-emitting pen-point unit 52 is made of a light-emitting diode (LED), though not limited thereto. Upon reception of a light-emission driving signal from the driving circuit 55, the light-emitting pen-point unit 52 emits light.

The switch 53 enables a user to establish an electric connect state or an electric disconnection state in a part of the driving circuit 55. The user can control the connection/disconnection state of the driving circuit 55 by manipulating the switch 53. By this means, the user can switch ON/OFF the power supply 54.

Figure 5A:
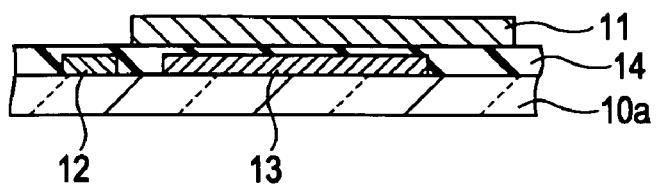
FIGS. 5A, 5B, 5C, and 5D are a set of sectional views that illustrates an example of the formation process of an optical transmission member of the electrophoresis display device according to the first embodiment of the invention.

FIGS. 5A, 5B, 5C, and 5D are a set of sectional views that illustrates an example of the formation process of the optical transmission member 40 that is made of an ultraviolet (UV) curing resin according to an exemplary embodiment of the invention. As a first step of a series of the formation steps of the optical transmission member 40 according to the present embodiment of the invention, for each pixel unit, the pixel driving circuit 13 and the optical detection element 12 are formed on the base substance 10a of the element substrate 10. Then, the insulation film 14 is deposited on the surface of the base substance 10a of the element substrate 10 so as to cover the pixel driving circuit 13 and the optical detection element 12 formed thereon. Thereafter, the pixel electrode 11 is formed on the insulation layer 14. A layer structure that is formed as a result of the above-described step is illustrated in FIG. 5A.

Figure 5B:
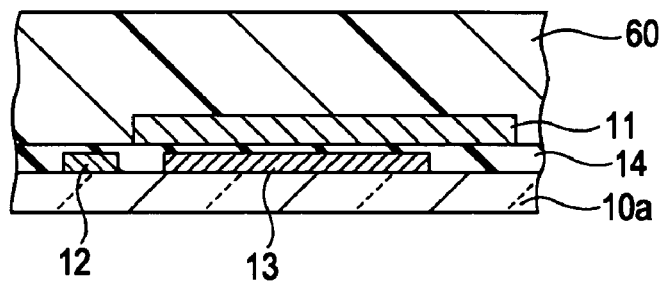

In the next step, as illustrated in FIG. 5B, a UV-curing resin material such as a UV-curing epoxy resin, though not limited thereto, is coated on the insulation layer 14 and the pixel electrode 11. The formed coating of the UV-curing resin material constitutes a resin material layer 60. When the UV-curing resin material is coated on the insulation layer 14 and the pixel electrode 11 to form the resin material layer 60, a spin coating method or a doctor blade method can be used without any intention of limitation thereto.

Figure 5C:
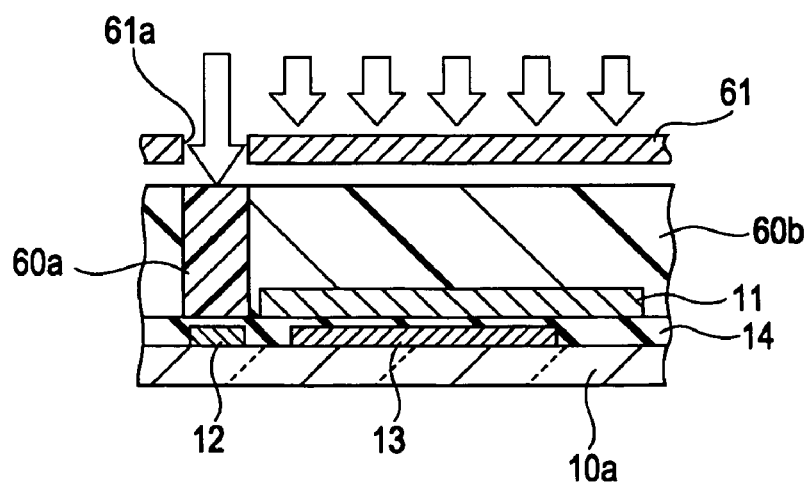

In the next step, after the placement of a metal mask 61, which has an opening 61a at a position that overlaps the position of the optical detection element 12 in a plan view, over the resin material layer 60, ultraviolet light is irradiated thereon from above the metal mask 61. Because the metal mask 61 has the opening 61a, UV light is selectively irradiated onto a partial region (i.e., partial portion) 60a of the resin material layer 60, where the partial region 60a of the resin material layer 60 is an area (i.e., portion) over the optical detection element 12. As a result thereof, the partial portion 60a of the resin material layer 60 over the optical detection element 12 becomes UV-hardened. This partially hardening process is illustrated in FIG. 5C. A remaining region (i.e., portion) 60b of the resin material layer 60 that is covered by the metal mask 61 and thus not exposed to UV irradiation is not hardened even after the step shown in FIG. 5C.

Figure 5D:
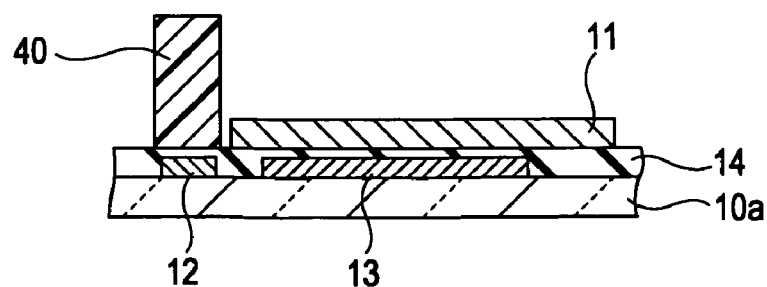

In the next step, the remaining portion 60b of the resin material layer 60 that is covered by the metal mask 61 and thus not exposed to UV irradiation in the preceding step illustrated in FIG. 5C is removed by means of a removing solvent or the like. As a result thereof, as illustrated in FIG. 5D, the optical transmission member 40 is formed over the optical detection element 12. Depending on the selection of a material thereof, the optical transmission member 40 can be formed by means of any alternative formation method other than that explained above. For example, if a resin material is adopted, it is possible to form the optical transmission member 40 by means of a sputtering method in addition to the coating method described above. If an inorganic substance is adopted, it is possible to form the optical transmission member 40 by means of a chemical vapor deposition (CVD) method or a sol-gel processing method, though not limited thereto.

Figure 6:
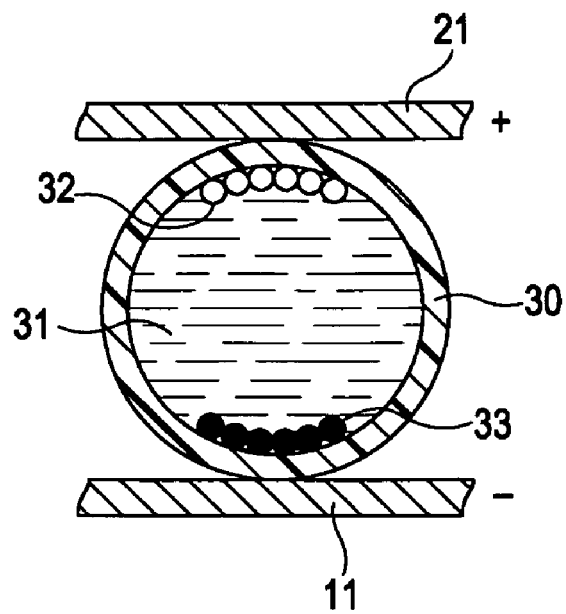
FIG. 6 is a diagram that schematically illustrates an example of the operation of a microcapsule under a certain voltage condition.

Next, the operation of the electrophoresis display device 1 according to the present embodiment of the invention is explained below. First of all, an explanation is given below of the fundamental operation of the microcapsule 30, which has the configuration explained above. When a voltage is applied in such a manner that the voltage level (i.e., electric potential) of the common electrode 21 is relatively high in comparison with that of the pixel electrode 11, as illustrated in FIG. 6, the black particles 33, which are positively charged, are drawn to the pixel-electrode (11) side in the microcapsule 30 due to Coulomb force. On the other hand, the white particles 32, which are negatively charged, are drawn to the common-electrode (21) side in the microcapsule 30 due to Coulomb force. Consequently, the white particles 32 gather at the display-surface side of the microcapsule 30. As a result thereof, the color of the white particle 32, that is, white, is displayed on the display surface.

Figure 7:
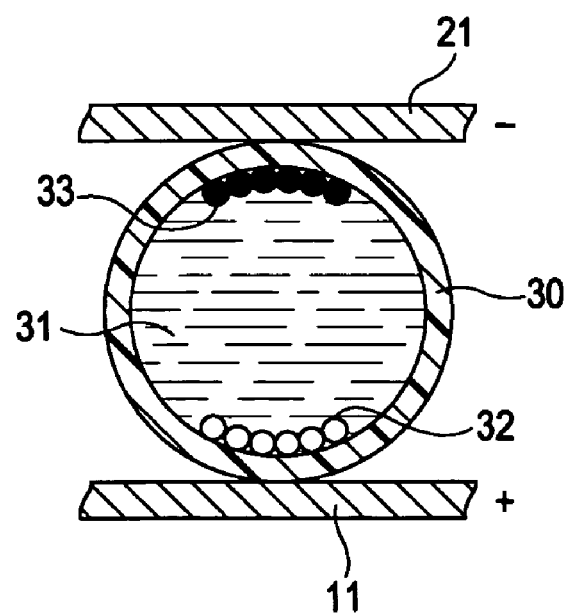
FIG. 7 is a diagram that schematically illustrates an example of the operation of a microcapsule under another voltage condition.

When a voltage is applied in such a manner that the voltage level of the pixel electrode 11 is relatively high in comparison with that of the common electrode 21, as illustrated in FIG. 7, the white particles 32, which are negatively charged, are drawn to the pixel-electrode (11) side in the microcapsule 30 due to Coulomb force. On the other hand, the black particles 33, which are positively charged, are drawn to the common-electrode (21) side in the microcapsule 30 due to Coulomb force. Consequently, the black particles 33 gather at the display-surface side of the microcapsule 30. As a result thereof, the color of the black particle 33, that is, black, is displayed on the display surface. It should be noted that the color of the "black" particle 33 could be red, green, or blue in a case where full-color display is performed in place of monochrome display.

Next, the combined operation of the electrophoresis display device 1 according to the present embodiment of the invention and the optical pen device 50 is explained below. In its initial display state, the image display unit 2 of the electrophoresis display device 1 is in a normally white mode. When a user-viewer who monitors the image display unit 2 of the electrophoresis display device 1 turns the switch 53 of the optical pen device 50 into an ON state, the light-emitting pen-point unit 52 thereof enters a light-emitting state. Upon the placement or positioning of the light-emitting pen-point unit 52 of the optical pen device 50 near the image display unit 2 of the electrophoresis display device 1 in such a manner that the light-emitting pen-point unit 52 thereof is pointed toward the image display unit 2 of the electrophoresis display device 1 after the user turned ON the switch 53 of the optical pen device 50, light L that has been emitted from the light-emitting pen-point unit 52 thereof is irradiated onto the display substrate 20.

Figure 8:
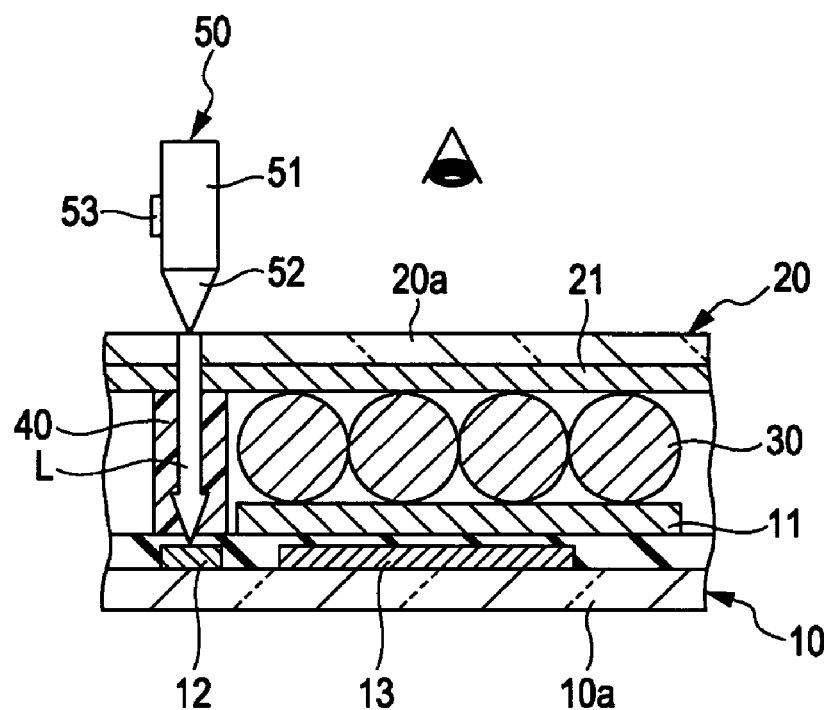
FIG. 8 is a sectional view that schematically illustrates an example of the combined operation of an electrophoresis display device according to the first embodiment of the invention and an optical pen device.

As the user-viewer further moves the light-emitting pen-point unit 52 of the optical pen device 50 over the image display unit 2 of the electrophoresis display device 1 in a two-dimensional direction, the light L that has been emitted from the light-emitting pen-point unit 52 thereof enters the optical transmission member 40 as incident light at the time when the location of the moving light-emitting pen-point unit 52 thereof overlaps the light-propagating area at which the optical transmission member 40 is formed in a plan view. This is illustrated in FIG. 8. The incident light L, which has entered through the display surface 20, propagates inside the optical transmission member 40 toward the element substrate 10. Then, the propagation light L passes through the insulation layer 14 to reach the optical detection element 12. As the light L enters the optical detection element 12, an electric signal is generated inside the optical detection element 12.

An electric signal that is generated in the optical detection element 12 is then sent to, for example, an external control circuit that is not illustrated in the drawing, though not necessarily limited thereto. The external control circuit is configured to make a judgment so as to identify the optical detection element 12 of the pixel area 7 onto which the light L is irradiated. Then, the external control circuit commands an image to be displayed on the basis of the detected trajectory of the light-emitting pen-point unit 52 of the optical pen device 50.

As explained above, in the configuration of the electrophoresis display device 1 according to the present embodiment of the invention, the microcapsules 30 are sandwiched between the element substrate 10 and the display substrate 20 that are provided opposite to each other. The optical detection element 12 is provided in each of the pixel areas 7. In addition to the microcapsules 30, the optical transmission members 40 are formed between the element substrate 10 and the display substrate 20. Having the above-described configuration, the electrophoresis display device 1 according to the present embodiment of the invention ensures that light emitted from the light-emitting pen-point unit 52 of the optical pen device 50, though not limited thereto, propagates through the optical transmission member 40 to reach the optical detection element 12 without being shut off by electrically charged particles and/or a dispersion medium. Thus, as an advantage of some aspects thereof, the invention provides the electrophoresis display device 1 that has an excellent optical sensing capability in addition to an image display capability, which offers a broad range of applications and uses for the benefit of users.

Second Embodiment

Figure 9:
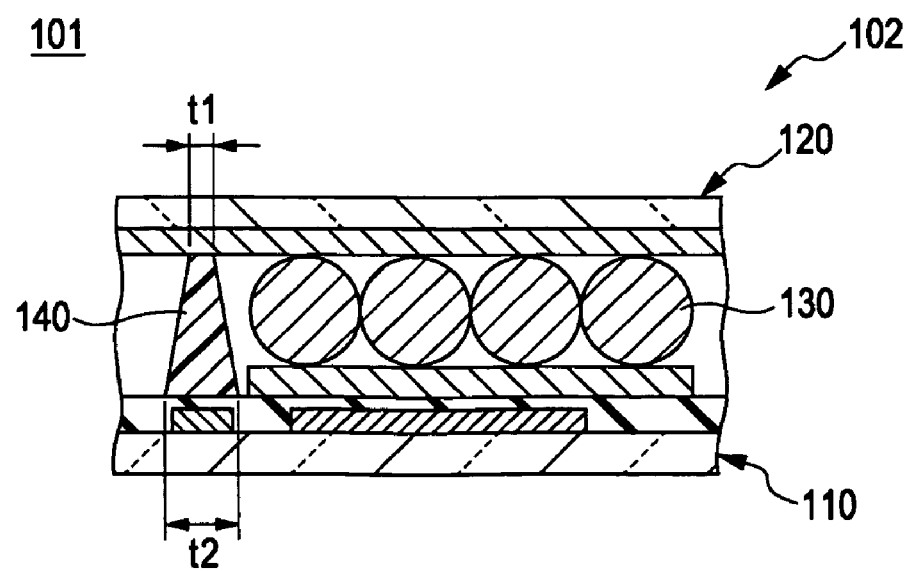
FIG. 9 is a sectional view that schematically illustrates an example of the configuration of an electrophoresis display device according to a second embodiment of the invention.

Next, with reference to the accompanying drawing, a second exemplary embodiment of the invention is explained below. An electrophoresis display device 101 according to the present embodiment of the invention differs from the electrophoresis display device 1 according to the first embodiment of the invention described above in that the structure of an optical transmission member 140 in an image display unit 102 of the former differs from that of the optical transmission member 40 in the image display unit 2 of the latter. Specifically, in the configuration of the electrophoresis display device 101 according to the present embodiment of the invention, as understood from FIG. 9, the cross-sectional dimension of the optical transmission member 140 increases from a display-substrate (120) side toward an element-substrate (110) side. That is, the width of the cross section of the optical transmission member 140 that is virtually measured in a direction parallel with the surface of an element substrate 110 or a display substrate 120 increases as the virtual cross section thereof approaches the element substrate 110. Since the optical transmission member 140 is "spread toward the bottom (in the illustrated example)" as explained above, the width (i.e., dimension) t2 of the optical transmission member 140 that is measured at the element-substrate (110) side is larger than the width t1 thereof that is measured at the display-substrate (120) side.

As explained above, since the width t2 of the optical transmission member 140 that is measured at the element-substrate (110) side is larger than the width t1 thereof that is measured at the display-substrate (120) side in the configuration of the electrophoresis display device 101 according to the present embodiment of the invention, the opening ratio of the display substrate 120 is higher than that of the element substrate 110. Therefore, the electrophoresis display device 101 according to the present embodiment of the invention makes it possible to display an image with enhanced contrast.

Third Embodiment

Figure 10:
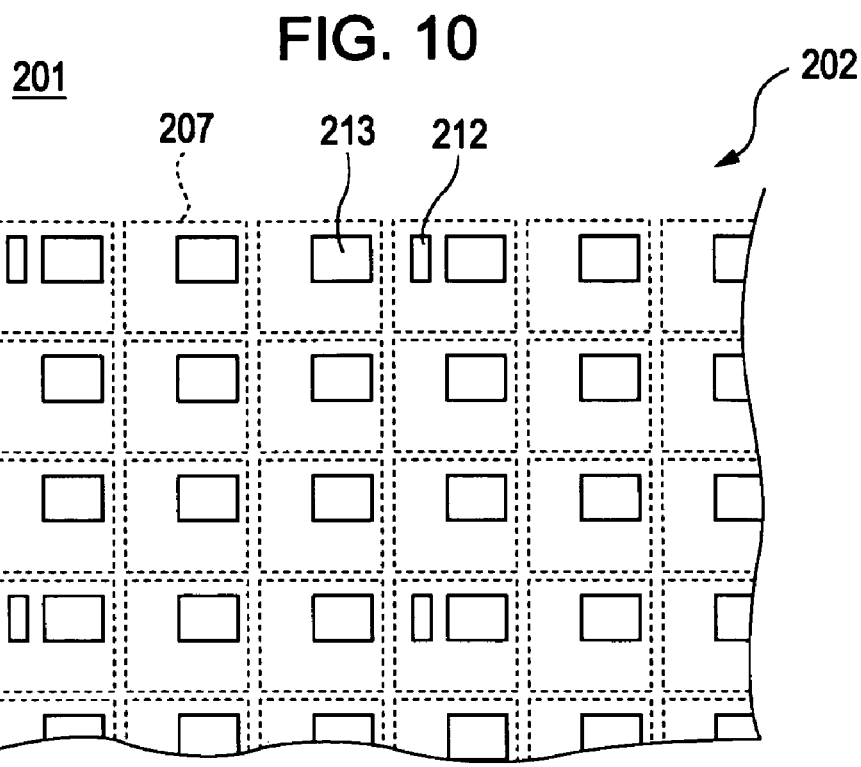
FIG. 10 is a plan view that schematically illustrates an example of the array pattern of pixel areas of an electrophoresis display device according to a third embodiment of the invention.

Next, with reference to the accompanying drawing, a third exemplary embodiment of the invention is explained below. An electrophoresis display device 201 according to the present embodiment of the invention differs from the electrophoresis display device 1 according to the first embodiment of the invention described above in that the array pattern (i.e., arrangement pattern) of optical detection elements 212 in an image display unit 202 of the former differs from that of the optical detection elements 12 in the image display unit 2 of the latter. Specifically, as illustrated in FIG. 10, in the configuration of the electrophoresis display device 201 according to the present embodiment of the invention, one optical detection element 212 is provided not in each of a plurality of pixel areas 207 but in each group of pixel areas 207. In the illustrated example, one optical detection element 212 is provided for every third pixel area 207. The array pattern of optical transmission members 240 each of which is formed at a position overlapping the corresponding optical detection element 212 in a plan view is the same as that of the optical detection elements 212.

Generally speaking, in the technical field of a display device, it is known that the minimum resolution that is required for the recognition of a handwritten input is lower than the minimum resolution that is required for the display of images. As explained above, in the configuration of the electrophoresis display device 201 according to the present embodiment of the invention, the optical detection element 212 and the optical transmission member 240 are provided not in each of the pixel areas 207 but in each group thereof. With such a configuration, in comparison with a case where the optical detection element 212 and the optical transmission member 240 are provided in every pixel area 207, it is possible to obtain a higher opening ratio while maintaining detection accuracy in handwritten input recognition at a sufficient level.

Fourth Embodiment

Figure 11:
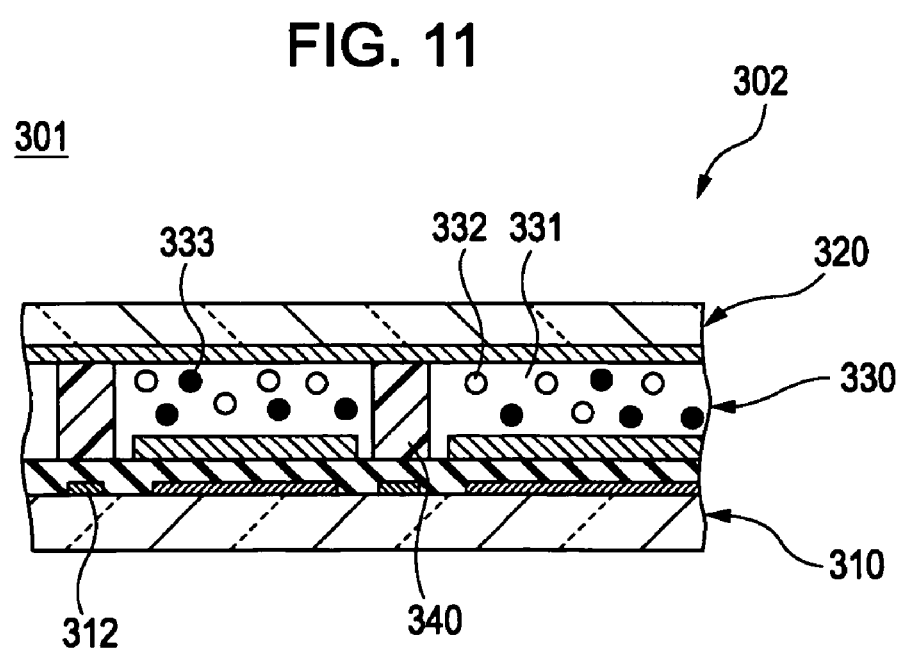
FIG. 11 is a sectional view that schematically illustrates an example of the configuration of an electrophoresis display device according to a fourth embodiment of the invention.

Next, with reference to the accompanying drawing, a fourth exemplary embodiment of the invention is explained below. An electrophoresis display device 301 according to the present embodiment of the invention differs from the electrophoresis display device 1 according to the first embodiment of the invention described above in that the structure of an electrophoresis material layer 330 in an image display unit 302 of the former differs from that of the electrophoresis material layer in the image display unit 2 of the latter. Specifically, as illustrated in FIG. 11, in the configuration of the electrophoresis display device 301 according to the present embodiment of the invention, the electrophoresis material layer 330 has no microcapsules. With no microcapsules being contained therein, white particles 332 and black particles 333 are dispersed in a dispersion medium 331. Partition walls 340 demarcate pixel areas from one another. Each of the partition walls 340 has an optical transmission function. Similar to the configuration of each of the optical transmission members 40 according to the first embodiment of the invention that is made of a material that can transmit light, each of the partition walls 340 according to the present embodiment of the invention is made of an optically transparent resin material or the like. A part of each of the partition walls 340 overlaps the corresponding optical detection element 312 in a plan view, which is also similar to the configuration of each of the optical transmission members 40 according to the first embodiment of the invention.

As explained above, the configuration of the electrophoresis display device 301 according to the present embodiment of the invention can be summarized as follows. The electrophoresis material layer 330 is configured as liquid composition that has no microcapsules. The liquid composition is made up of the dispersion medium 331, the white particles 332, and the black particles 333. The white particles 332 and the black particles 333 are dispersed in the dispersion medium 331. The partition walls 340 demarcate pixel areas from one another. A part of each of the partition walls 340 overlaps the corresponding optical detection element 312 in a plan view. Each of the partition walls 340 has an optical transmission function. That is, each of the partition walls 340 doubles as an optical transmission member. Having the above-summarized configuration, in comparison with a case where separate or additional optical transmission members other than the partition walls 340 are provided, the electrophoresis display device 301 according to the present embodiment of the invention offers a higher opening ratio, which is advantageous.

Fifth Embodiment

Figure 12:
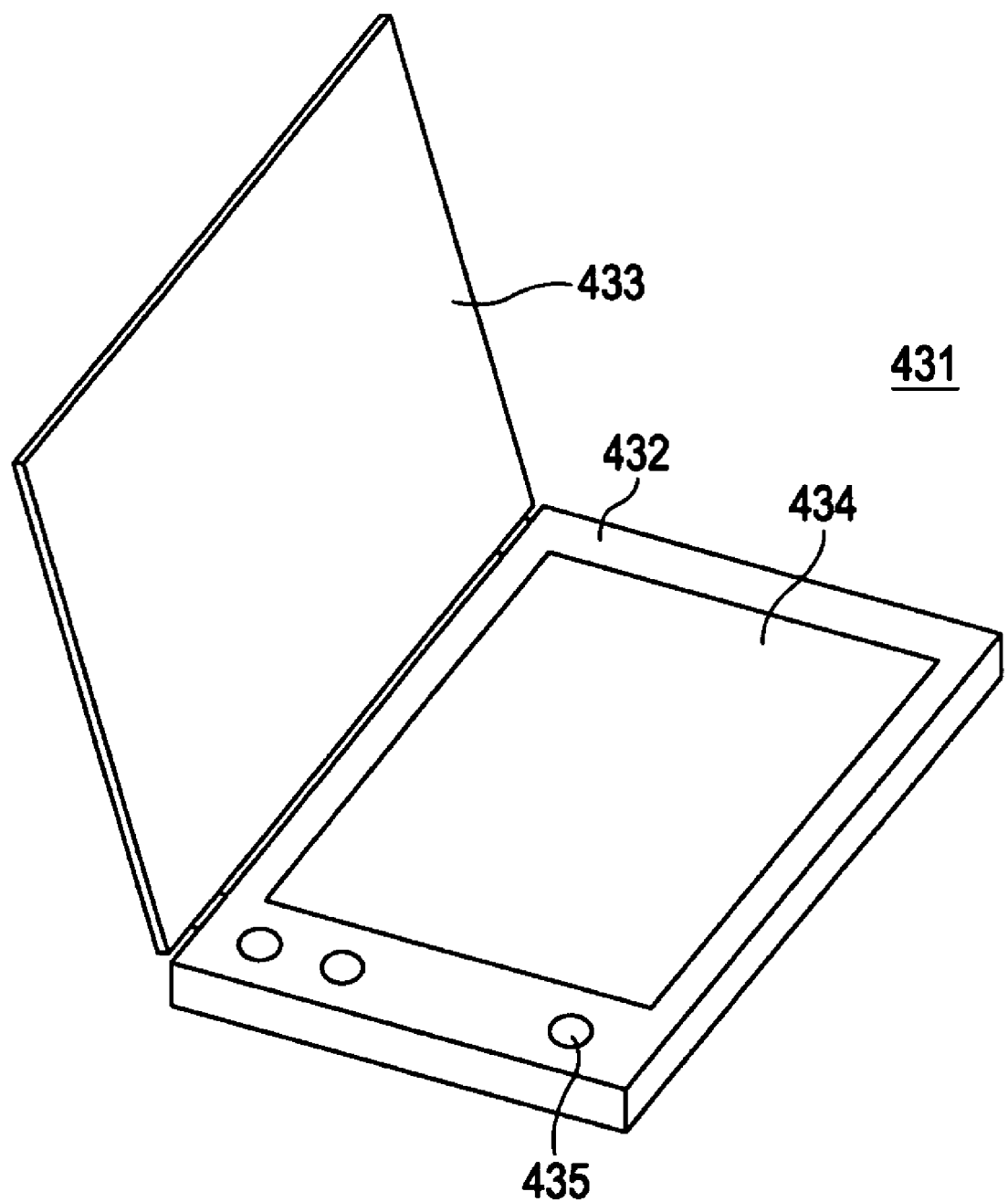
FIG. 12 is a perspective view that schematically illustrates an example of the configuration of an electronic book, which is an example of an electronic apparatus according to a fifth embodiment of the invention.

With reference to the accompanying drawing, an electronic apparatus according to a fifth exemplary embodiment of the invention is explained below. In the following description, an electronic book is taken as an example of an electronic apparatus according to the fifth exemplary embodiment of the invention. FIG. 12 is a perspective view that schematically illustrates an example of the configuration of an electronic book, which is an example of an electronic apparatus according to the present embodiment of the invention. As illustrated in the drawing, an electronic book 431 is provided with a book-shaped frame 432 and a cover member 433. The cover member 433 hinges on the frame 432. A user can open and close the cover member 433. A display unit 434 is provided on the surface of the frame 432. When the cover member 433 is opened, the display surface of the display unit 434 is exposed to the outside. A manual operation button unit 435 is provided on the frame 432. A controller, a counter, and a memory are built inside the frame 432. The electrophoresis display device 1, 101, 201, or 301 according to the foregoing exemplary embodiment of the invention is used as the display unit 434. As explained above, the electronic book 431, which is an example of an electronic apparatus according to the present embodiment of the invention, is provided with the electrophoresis display device 1, 101, 201, or 301 according to the foregoing exemplary embodiment of the invention, which has an excellent optical sensing capability in addition to an image display capability and thus offers a broad range of applications and uses for the benefit of users. Therefore, the electronic book 431 also offers a broad range of applications and uses for the benefit of users.

Although various exemplary embodiments of the present invention are described above, needless to say, the invention is in no case restricted to these exemplary embodiments described herein; the invention may be configured in an adaptable manner in a variety of variations and/or modifications without departing from the spirit thereof. In the foregoing exemplary embodiments of the invention, an optical transmission member (i.e., light-propagation member) is used to make up an optical transmission path (i.e., light-propagation path). However, the invention is not limited to such a specific configuration. For example, the optical transmission path may be configured as an air layer that does not have any optical transmission member. As another modification example thereof, the optical transmission path may be made of a photo-curable polymer material or the like. If a photo-curable polymer is used as the material of the optical transmission path, light propagates through the fibrous optical transmission path. For this reason, it is not necessary to provide the optical transmission path at a position overlapping the corresponding optical detection element in a plan view. That is, such a photo-curable polymer optical transmission path is advantageous in that it can be provided at a desired position other than the overlapping position.

In each of the foregoing exemplary embodiments of the invention, it is assumed that the electrophoresis display device 1, 101, 201, or 301 performs monochrome display by means of the white particles 32 (332) and the black particles 33 (333). However, the invention is not limited to such a specific configuration. For example, the invention can be embodied as an electrophoresis display device that performs full-color display by means of colored particles such as red particles, green particles, blue particles, yellow particles and the like in place of the black particles 33 (333).

What is claimed is:

1. An electrophoresis display device comprising:
a first substrate;
a plurality of optical detection elements provided on the first substrate;
a second substrate facing the plurality of optical detection elements;
an electrophoresis material layer provided between the first substrate and the second substrate; and
a plurality of optical transmission paths each of which is provided between the first substrate and the second substrate and propagates incident light that enters through an outer surface of the second substrate so that the light reaches one of the plurality of optical detection elements.

2. The electrophoresis display device according to claim 1, wherein each of the plurality of optical transmission paths is provided at a position overlapping one of the plurality of optical detection elements in a plan view.

3. The electrophoresis display device according to claim 1, wherein each of the plurality of optical transmission paths is made of a material that can transmit the incident light that enters through the outer surface of the second substrate.

4. The electrophoresis display device according to claim 1, wherein each of the plurality of optical transmission paths has a cross-sectional dimension that increases from the electrophoresis-material-layer-side surface of the second substrate toward the opposite electrophoresis-material-layer-side surface of the first substrate.

5. An electronic apparatus that is provided with the electrophoresis display device according to claim 1.

6. The electrophoresis display device according to claim 1, further comprising a plurality of pixel areas in each of which a pixel electrode is provided on the first substrate.

7. The electrophoresis display device according to claim 6, wherein the optical detection elements and the optical transmission paths are provided not in each of the plurality of pixel areas but for every certain number of pixel areas.

8. The electrophoresis display device according to claim 6, wherein the electrophoresis material layer is made of a liquid composition containing an electrophoresis material that is dispersed in a dispersion medium; partition walls each of which demarcates the pixel area, the partition walls at least partially overlapping the plurality of optical detection elements in a plan view and doubling as the optical transmission paths.

* * * * *